Patented June 5, 1951

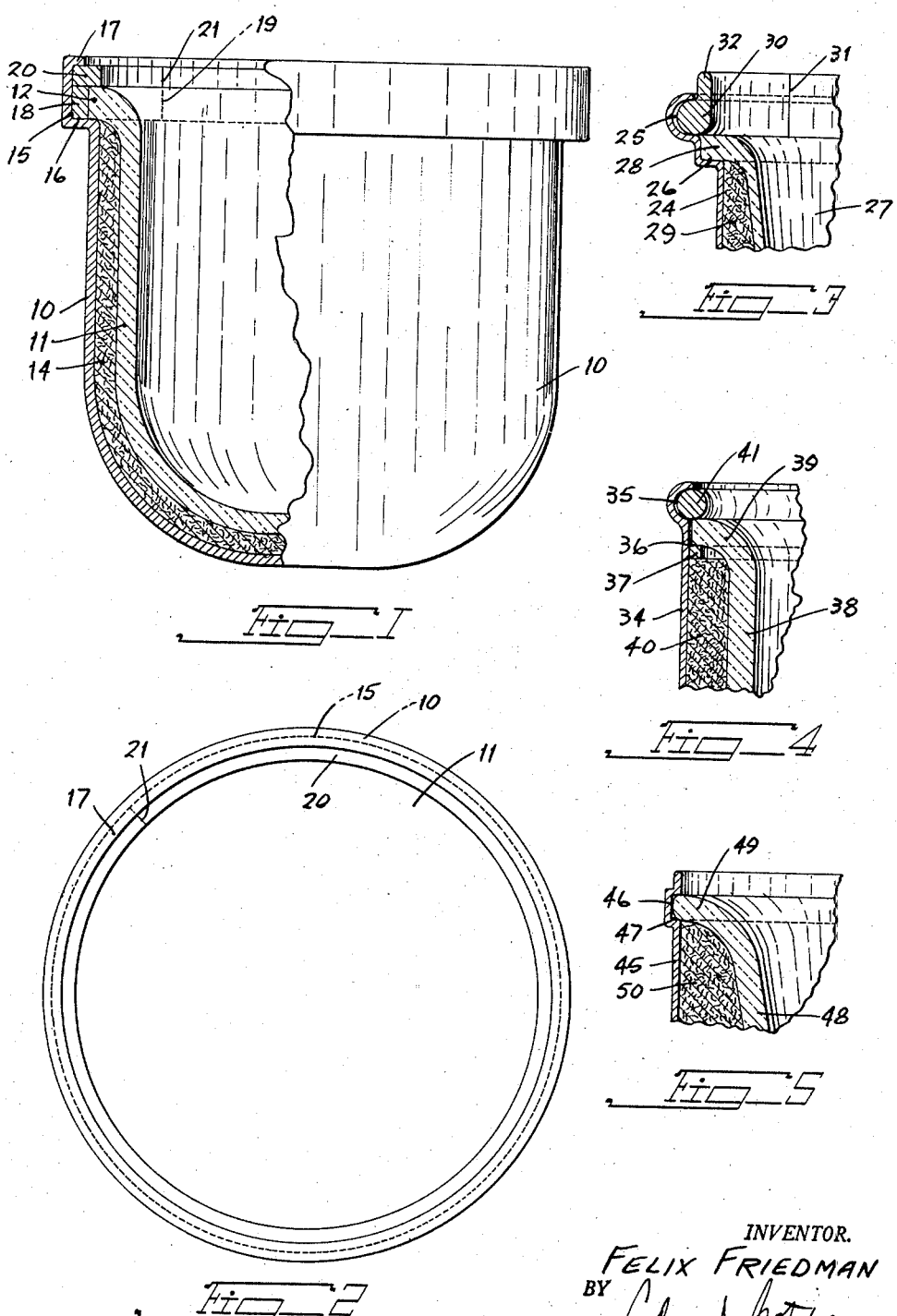

2,555,538

UNITED STATES PATENT OFFICE 2,555,538

INSULATED CONTAINER

Felix Friedman, Brooklyn, N. Y.

Application June 4, 1947, Serial No. 752,385

2 Claims. (Cl. 220—9)

This invention relates to new and useful improvements in containers intended particularly for food, chopped or cubed ice, etc.

The new and improved container is characterized by the fact that it is composed of an outer casing, an inner container, insulation between the outer casing and inner container, and means for sealing the top portions of said outer casing and inner container together. More particularly, the outer casing may be metallic or non-metallic, the inner container preferably is constructed of thermo-plastic material, china, or glass. The insulation material may be in the nature of insulation wool.

It is an object of this invention to provide a retaining and sealing ring for securely holding the inner container in position. This ring may be a split ring or an endless ring having sufficient resiliency and elasticity to allow for distortion to a point less than the diameter of a retaining groove for the ring. Also the ring may have a flange over which a cover may be fitted.

The new and improved food, ice, etc. container may be round, square, oval, or of other shapes and still embody the broad concepts of this invention.

Another object of the invention is the construction of a device as described, which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Fig. 1 is an elevational view of a food, ice, etc. container constructed in accordance with this invention, a portion thereof being broken away to disclose interior parts.

Fig. 2 is a plan view of Fig. 1.

Fig. 3 is a fragmentary sectional view similar to a portion of Fig. 1 but illustrating a modified form of the invention.

Fig. 4 is another sectional view illustrating still another form of the invention.

Fig. 5 is still another sectional view showing still another form of the invention.

The food, ice, etc. container, as constructed in Figs. 1 and 2, includes an outer casing 10 having an open top, an inner container 11 of a size smaller than the said outer casing 10 and set into said outer casing and having an outwardly flared top portion 12 disposed adjacent the top portion of the outer casing 10. Insulation material 14 is disposed between said outer casing 10 and said inner container 11. Means is provided for sealing the top portions of said outer casing 10 and inner container 11 together.

More specifically, the outer casing 10 has its open top provided with an internal circumferential groove 15 and an adjacent support shoulder 16. Preferably, the outer casing 10 is constructed of sheet metal. However, other materials may also be used. The groove 15 is formed by shaping the top portion of the outer casing as shown in Fig. 1. In the particular construction shown the top edge of the container is provided with an inwardly directed flange 17 which is opposed to the shoulder 16. However, the inside diameter of the flange 17 is larger than the inside diameter of the shoulder 16.

A filling ring 18 is rested on the shoulder 16 and has an inside diameter equal to or smaller than the inside diameter of the flange 17. This filling ring 18 is a split ring having a split 19 at one side so that it may be easily engaged upon and removed from the shoulder 16. The outwardly flared top portion 12 of the inner container 11 rests upon the shoulder 16 and engages against the inner diameter of the filling ring 18. A retaining and sealing ring 20 is engaged beneath the flange 17 and engages against the top edge of the outwardly flared top portion 12 for securely holding the inner container 11 in position and for sealing the top portions of the outer casing 10 and inner container 11. The retaining and sealing ring 20 is a split ring having a split 21 at one side by which it may be flexed so as to easily engage into and be removed from its position beneath the flange 17. The insulation material 14 may be in the nature of insulation wool, such as spun glass or other substances.

The food and ice container may be used for holding foods, ice cubes, and other substances. A feature of the container resides in the fact that the insulation material 14 will retard the transfer of heat through the walls of the container. An important feature of the construction of the container resides in the provision of the retaining and sealing ring 20. This ring 20 serves to retain the inner container 11 in position and to seal the top portions of the outer casing 10 and container 11 together.

In Fig. 3 a modified form of the invention has been disclosed, distinguishing from the prior form merely in the construction of the top portions of the food and ice container. More specifically, the food or ice container includes an outer casing 24 having an open top provided with an internal circumferential groove 25 and an adjacent support shoulder 26. An inner container 27 of a size smaller than said outer casing is set into said outer casing 24. Said inner container 27 is provided with an outwardly flared top portion 28 rested upon said support shoulder 26. Insulation material 29 is disposed between said outer casing 24 and inner container 27. A split retaining and sealing ring 30 is associated with the groove 25 and engages on and against said flared top portion 28 for retaining said inner container 27 in position and for sealing the space between the outer casing 24 and inner container 27. Said ring 30 has an upwardly projecting flange 32 projecting above the top of the casing 24 upon which a cover for the container may be engaged. The sealing ring 30 has a split 31 at one side by which it may easily be opened and closed so as to engage into and be removed from the groove 25.

In Fig. 4 still another form of the invention has been disclosed in which the food and ice container includes an outer casing 34 having an open top provided with an internal circumferential groove 35 and an adjacent support shoulder 36 formed by attaching a ring 37 upon the inside face of the casing 34 at a point slightly below the groove 35. An inner container 38 of a size smaller than said outer casing 34 is set into said outer casing 34 and is provided with an outwardly flared top portion 39 rested upon said support shoulder 36. Insulation material 40 is disposed between said outer casing 34 and inner container 38. A retaining and sealing ring 41 is engaged in the groove 35 and engages on said flared top portion 39 for retaining said inner container 38 in position and for sealing the space between said outer casing 34 and inner container 38. The retaining and sealing ring 41 is endless and of material having sufficient elasticity to allow for distorting the ring to a point less than the diameter of said groove 35 so that it may be engaged into and removed from position.

In Fig. 5 another form of the invention has been disclosed in which the food, ice, etc., container includes an outer casing 45 having an open top provided with an internal circumferential groove 46 and an adjacent support shoulder 47. An inner container 48 of a size smaller than said outer casing 45 is set into said outer casing 45 and has an outwardly flared top portion 49 rested upon said support shoulder 47. The said outwardly flared top portion 49 is a forced fit in the top portion of the outer casing 45. Insulation material 50 is disposed between said outer casing 45 and inner container 48.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. A food, ice, etc. container, comprising an outer casing having an open top provided with an internal circumferential groove and an adjacent support shoulder, an inner container of a size smaller than said outer casing and set into said outer casing and having an outwardly flared open top portion rested upon said support shoulder, insulation material between said outer casing and inner container, and a sealing element associated with said groove and engaging on said flared top portion for retaining said inner container in position and sealing the space between said outer casing and inner container, said sealing element comprising a retaining and sealing ring extending through 360° and having all portions located outwards of said open top portion of said inner container in order not to extend into or across the open top of said inner container, and having an annular portion projecting above the top portion of said outer casing.

2. A food, ice, etc. container, comprising an outer casing having an open top provided with an internal circumferential groove and an adjacent support shoulder, an inner container of a size smaller than said outer casing and set into said outer casing and having an outwardly flared top portion rested upon said support shoulder, insulation material between said outer casing and inner container, and a sealing element associated with said groove and engaging on said flared top portion for retaining said inner container in position and sealing the space between said outer casing and inner container, said sealing element comprising a retaining and sealing ring having a flange projecting above said outer casing for a cover to engage upon.

FELIX FRIEDMAN.

REFERENCES CITED

The following references are of record in the file of this patent:

UNITED STATES PATENTS

| Number | Name | Date |
|---|---|---|
| 212,064 | Spencer | Feb. 4, 1879 |
| 601,845 | Smith | Apr. 5, 1898 |
| 611,061 | Dann | Sept. 20, 1898 |
| 1,207,937 | Kruse | Dec. 12, 1916 |
| 1,268,550 | Dunlap | June 4, 1918 |
| 1,696,953 | Harris | Jan. 1, 1929 |
| 1,713,224 | Gunter | May 14, 1929 |
| 1,854,993 | Lambert | Apr. 19, 1932 |
| 2,040,024 | Roberts | May 5, 1936 |
| 2,072,630 | Ferry | Mar. 2, 1937 |
| 2,285,096 | Sailer et al. | June 2, 1942 |

FOREIGN PATENTS

| Number | Country | Date |
|---|---|---|
| 798,818 | France | May 27, 1936 |